(12) United States Patent
Gopi et al.

(10) Patent No.: US 8,531,398 B1
(45) Date of Patent: *Sep. 10, 2013

(54) METHOD AND APPARATUS FOR USING A VIRTUAL POINTER TO SELECT AN OBJECT IN A DISPLAY

(75) Inventors: Paramesh Gopi, Cupertino, CA (US); Alarabi Omar Hassen, Aliso Viejo, CA (US)

(73) Assignee: Marvell International Ltd., Hamilton (BM)

( * ) Notice: Subject to any disclaimer, the term of this patent is extended or adjusted under 35 U.S.C. 154(b) by 120 days.

This patent is subject to a terminal disclaimer.

(21) Appl. No.: 13/008,179

(22) Filed: Jan. 18, 2011

Related U.S. Application Data

(63) Continuation of application No. 11/590,031, filed on Oct. 31, 2006, now Pat. No. 7,872,636.

(60) Provisional application No. 60/739,485, filed on Nov. 23, 2005.

(51) Int. Cl.
*G06F 3/033* (2013.01)

(52) U.S. Cl.
USPC .......................................................... 345/158

(58) Field of Classification Search
USPC ........................................ 345/158, 163–165
See application file for complete search history.

(56) References Cited

U.S. PATENT DOCUMENTS

| 6,424,334 | B1 | 7/2002 | Zimmerman et al. | |
|---|---|---|---|---|
| 6,515,669 | B1 | 2/2003 | Mohri | |
| 6,545,661 | B1 | 4/2003 | Goschy et al. | |
| 6,747,632 | B2 * | 6/2004 | Howard | 345/158 |
| 6,806,863 | B1 | 10/2004 | Howard | |
| 6,956,503 | B2 | 10/2005 | Yokokohji et al. | |
| 7,084,859 | B1 | 8/2006 | Pryor | |
| 7,089,099 | B2 | 8/2006 | Shostak et al. | |
| 7,280,096 | B2 | 10/2007 | Marvit et al. | |
| 7,454,309 | B2 * | 11/2008 | Lawrence et al. | 702/160 |
| 7,872,636 | B1 * | 1/2011 | Gopi et al. | 345/158 |
| 8,139,031 | B2 * | 3/2012 | Calarco et al. | 345/163 |

OTHER PUBLICATIONS

ANSI/IEEE Std 802.11, 1999 Edition; Information technology—Telecommunications and information exchange between systems—Local and metropolitan area networks—Specific requirements—Part 11:Wireless LAN Medium Access Control (MAC) and Physical Layer (PHY) Specifications; LAN/MAN Standards Committee of the IEEE Computer Society; 531 pages.

(Continued)

*Primary Examiner* — Bipin Shalwala
*Assistant Examiner* — Steven Holton

(57) ABSTRACT

An apparatus includes first and second accelerometers, a display device implemented in a vehicle, and a controller. The display device displays, to a user, a cursor relative to one or more objects. The first accelerometer generates a first signal representing an acceleration of the vehicle due to motion of the vehicle. The second accelerometer is worn by the user and generates a second signal representing both an acceleration of the user within the vehicle and the acceleration of the vehicle due to the motion of the vehicle. The controller isolates, based on the first signal, i) the acceleration of the user within the vehicle represented in the second signal from ii) the acceleration of the vehicle represented in the second signal. The controller moves the cursor relative to the objects based on the acceleration of the user within the vehicle as isolated from the acceleration of the vehicle.

20 Claims, 11 Drawing Sheets

(56) References Cited

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11 b-1999 (Supplement to IEEE Std 802.11-1999 Edition); Supplement to IEEE Standard for Information technology—Telecommunications and information exchange between systems—Local and metropolitan area networks—Specific requirements—Part 11:Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE P802.11g/D8.2, Apr. 2003 ( Supplement to ANSI/IEEE Std 802.11-1999(Reaff 2003)); DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

802.11 n; IEEE P802.11-04-0889r6; Wireless LANs, TGn Sync Proposal Technical Specification; 134 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society ; Oct. 1, 2004; 893 pages.

IEEE 802.20-PD-06, IEEE P 802.20 V 14, Jul. 16, 2004, Draft 802.20 Permanent Document, System Requirements for IEEE 802.20 Mobile Broadband Wireless Access Systems—Version 14,24 pages.

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 19991EEE-SA Standards Board; 96 pages.

IEEE P802.11g/D8.2, Apr. 2003 (Supplement to ANSI/IEEE Std 802.11-1999(Reaff 2003)); DRAFT Supplement to STANDARD [for) Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

802.11n; IEEE P802.11-04/0889r6; Wireless LANs, TGn Sync Proposal Technical Specification; 134 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE 802.20-PD-06, IEEE P 802.20 V 14, Jul. 16, 2004, Draft 802.20 Permanent Document, System Requirements for IEEE 802.20 Mobile Broadband Wireless Access Systems—Version 14, 24 pages.

\* cited by examiner

METHOD AND APPARATUS FOR USING A VIRTUAL POINTER TO SELECT AN OBJECT IN A DISPLAY

CROSS-REFERENCE TO RELATED APPLICATIONS

This application is a continuation of U.S. application Ser. No. 11/590,031, filed on Oct. 31, 2006, which claims the benefit of U.S. Provisional Application Ser. No. 60/739,485 filed Nov. 23, 2005. The disclosures of the applications referenced above are incorporated herein by reference.

BACKGROUND

The present invention relates generally to pointing devices for displays. More particularly, the present invention relates to virtual pointing devices for displays.

Computers and computer displays are increasingly being used in environments where control of the computer using conventional input devices such as a keyboard and pointing devices such as a mouse is impractical or even dangerous. For example, automobile manufacturers are now incorporating computer displays in their vehicles, for example as a screen in the dashboard or even projected upon the windshield in the form of a heads-up display.

SUMMARY

In general, in one aspect, the invention features an apparatus comprising: an accelerometer adapted to be worn by a user, wherein the accelerometer, when worn by the user, generates an acceleration signal representing acceleration of the user along a plurality of axes; a display device to generate a display comprising one or more objects and a cursor; and a controller to move the cursor in the display in accordance with the acceleration signal.

In some embodiments, the controller selects one or more of the objects according to a position of the cursor and acceleration of the user. In some embodiments, the controller moves the cursor in the display in accordance with acceleration of the user along a first set of the axes; and the controller selects one or more of the objects according to a position of the cursor and acceleration of the user along a second set of the axes. In some embodiments, the display device comprises: a heads-up display. Some embodiments comprise a vehicle comprising the heads-up display, and a further accelerometer to generate a further acceleration signal representing acceleration of the vehicle along a further plurality of axes; wherein the controller moves the cursor in the display in accordance with the acceleration signal and the further acceleration signal. Some embodiments comprise a vehicle controller to control the vehicle in accordance with the acceleration signal and the further acceleration signal. In some embodiments, the acceleration signal comprises: a wireless signal. In some embodiments, the wireless signal is compliant with at least one of a plurality of standards including IEEE standards 802.11, 802.11a, 802.11b, 802.11g, 802.11n, 802.16, and 802.20.

In general, in one aspect, the invention features an apparatus comprising: accelerometer means, adapted to be worn by a user, for generating an acceleration signal representing acceleration of the user along a plurality of axes when worn by the user; display means for generating a display comprising one or more objects and a cursor; and controller means for moving the cursor in the display in accordance with the acceleration signal.

In some embodiments, the controller means selects one or more of the objects according to a position of the cursor and acceleration of the user. In some embodiments, the controller means moves the cursor in the display in accordance with acceleration of the user along a first set of the axes; and the controller means selects one or more of the objects according to a position of the cursor and acceleration of the user along a second set of the axes. In some embodiments, the display means comprises: means for displaying a heads-up display. Some embodiments comprise vehicle means for moving the user comprising the means for displaying a heads-up display, and further accelerometer means for generating a further acceleration signal representing acceleration of the vehicle means along a further plurality of axes; wherein the controller means moves the cursor in the display in accordance with the acceleration signal and the further acceleration signal. Some embodiments comprise vehicle controller means for controlling the vehicle means in accordance with the acceleration signal and the further acceleration signal. In some embodiments, the acceleration signal comprises: a wireless signal. In some embodiments, the wireless signal is compliant with at least one of a plurality of standards including IEEE standards 802.11, 802.11a, 802.11b, 802.11g, 802.11n, 802.16, and 802.20.

In general, in one aspect, the invention features a method comprising: receiving an acceleration signal from an accelerometer worn by a user, wherein the acceleration signal represents acceleration of the user along a plurality of axes; generating a display comprising one or more objects and a cursor; and moving the cursor in the display in accordance with the acceleration signal.

Some embodiments comprise selecting one or more of the objects according to a position of the cursor and acceleration of the user. Some embodiments comprise moving the cursor in the display in accordance with acceleration of the user along a first set of the axes; and selecting one or more of the objects according to a position of the cursor and acceleration of the user along a second set of the axes. Some embodiments comprise receiving a further acceleration signal representing acceleration of a vehicle along a further plurality of axes; and moving the cursor in the display in accordance with the acceleration signal and the further acceleration signal. Some embodiments comprise controlling the vehicle in accordance with the acceleration signal and the further acceleration signal. In some embodiments, the acceleration signal comprises: a wireless signal. In some embodiments, the wireless signal is compliant with at least one of a plurality of standards including IEEE standards 802.11, 802.11a, 802.11b, 802.11g, 802.11n, 802.16, and 802.20.

In general, in one aspect, the invention features a computer program executable on a processor, comprising: instructions for generating a display comprising one or more objects and a cursor; and instructions for moving the cursor in the display in accordance with an acceleration signal representing acceleration of a user along a plurality of axes. Some embodiments comprise instructions for selecting one or more of the objects according to a position of the cursor and acceleration of the user. Some embodiments comprise instructions for moving the cursor in the display in accordance with acceleration of the user along a first set of the axes; and instructions for selecting one or more of the objects according to a position of the cursor and acceleration of the user along a second set of the axes. Some embodiments comprise instructions for moving the cursor in the display in accordance with the acceleration signal and a further acceleration signal representing acceleration of a vehicle along a further plurality of axes. Some embodiments comprise instructions for controlling the vehicle in accordance with the acceleration signal and the further acceleration signal. In some embodiments, the acceleration signal comprises: a wireless signal. In some embodiments, the wireless signal is compliant with at least one of a plurality of standards including IEEE standards 802.11, 802.11a, 802.11b, 802.11g, 802.11n, 802.16, and 802.20.

In general, in one aspect, the invention features an apparatus comprising: a remote motion sensor to remotely sense motion of a user along a plurality of axes, and to generate a motion signal representing the motion of the user; a display device to generate a display comprising one or more objects and a cursor; and a controller to move the cursor in the display in accordance with the motion signal.

In some embodiments, the controller moves the cursor in the display in accordance with motion of the user along a first set of the axes; and the controller selects one or more of the objects according to a position of the cursor and motion of the user along a second set of the axes. In some embodiments, the display device comprises: a heads-up display. Some embodiments comprise a vehicle comprising the heads-up display. Some embodiments comprise a vehicle controller to control the vehicle in accordance with the motion signal. In some embodiments, the motion signal comprises: a wireless signal. In some embodiments, the wireless signal is compliant with at least one of a plurality of standards including IEEE standards 802.11, 802.11a, 802.11b, 802.11g, 802.11n, 802.16, and 802.20.

In general, in one aspect, the invention features an apparatus comprising: remote motion sensor means for remotely sensing motion of a user along a plurality of axes, and for generating a motion signal representing the motion of the user; display means for generating a display comprising one or more objects and a cursor; and controller means for moving the cursor in the display in accordance with the motion signal.

In some embodiments, the controller means moves the cursor in the display in accordance with motion of the user along a first set of the axes; and wherein the controller means selects one or more of the objects according to a position of the cursor and motion of the user along a second set of the axes. In some embodiments, the display means comprises: means for displaying a heads-up display. Some embodiments comprise vehicle means for moving the user comprising the heads-up display. Some embodiments comprise vehicle controller means for controlling the vehicle means in accordance with the motion signal. In some embodiments, the motion signal comprises: a wireless signal. In some embodiments, the wireless signal is compliant with at least one of a plurality of standards including IEEE standards 802.11, 802.11a, 802.11b, 802.11g, 802.11n, 802.16, and 802.20.

In general, in one aspect, the invention features a method comprising: remotely detecting motion of a user; generating a motion signal representing motion of the user along a plurality of axes; generating a display comprising one or more objects and a cursor; and moving the cursor in the display in accordance with the motion signal.

Some embodiments comprise moving the cursor in the display in accordance with motion of the user along a first set of the axes; and selecting one or more of the objects according to a position of the cursor and motion of the user along a second set of the axes. Some embodiments comprise controlling a vehicle in accordance with the motion signal. In some embodiments, the motion signal comprises: a wireless signal. In some embodiments, the wireless signal is compliant with at least one of a plurality of standards including IEEE standards 802.11, 802.11a, 802.11b, 802.11g, 802.11n, 802.16, and 802.20.

In general, in one aspect, the invention features a computer program executable on a processor, comprising: instructions for generating a display comprising one or more objects and a cursor; and instructions for moving the cursor in the display in accordance with a motion signal representing remotely-detected motion of a user along a plurality of axes.

Some embodiments comprise instructions for moving the cursor in the display in accordance with motion of the user along a first set of the axes; and instructions for selecting one or more of the objects according to a position of the cursor and motion of the user along a second set of the axes. Some embodiments comprise instructions for controlling a vehicle in accordance with the motion signal. In some embodiments, the motion signal comprises: a wireless signal. In some embodiments, the wireless signal is compliant with at least one of a plurality of standards including IEEE standards 802.11, 802.11a, 802.11b, 802.11g, 802.11n, 802.16, and 802.20.

The details of one or more implementations are set forth in the accompanying drawings and the description below. Other features will be apparent from the description and drawings, and from the claims.

Figure 1:
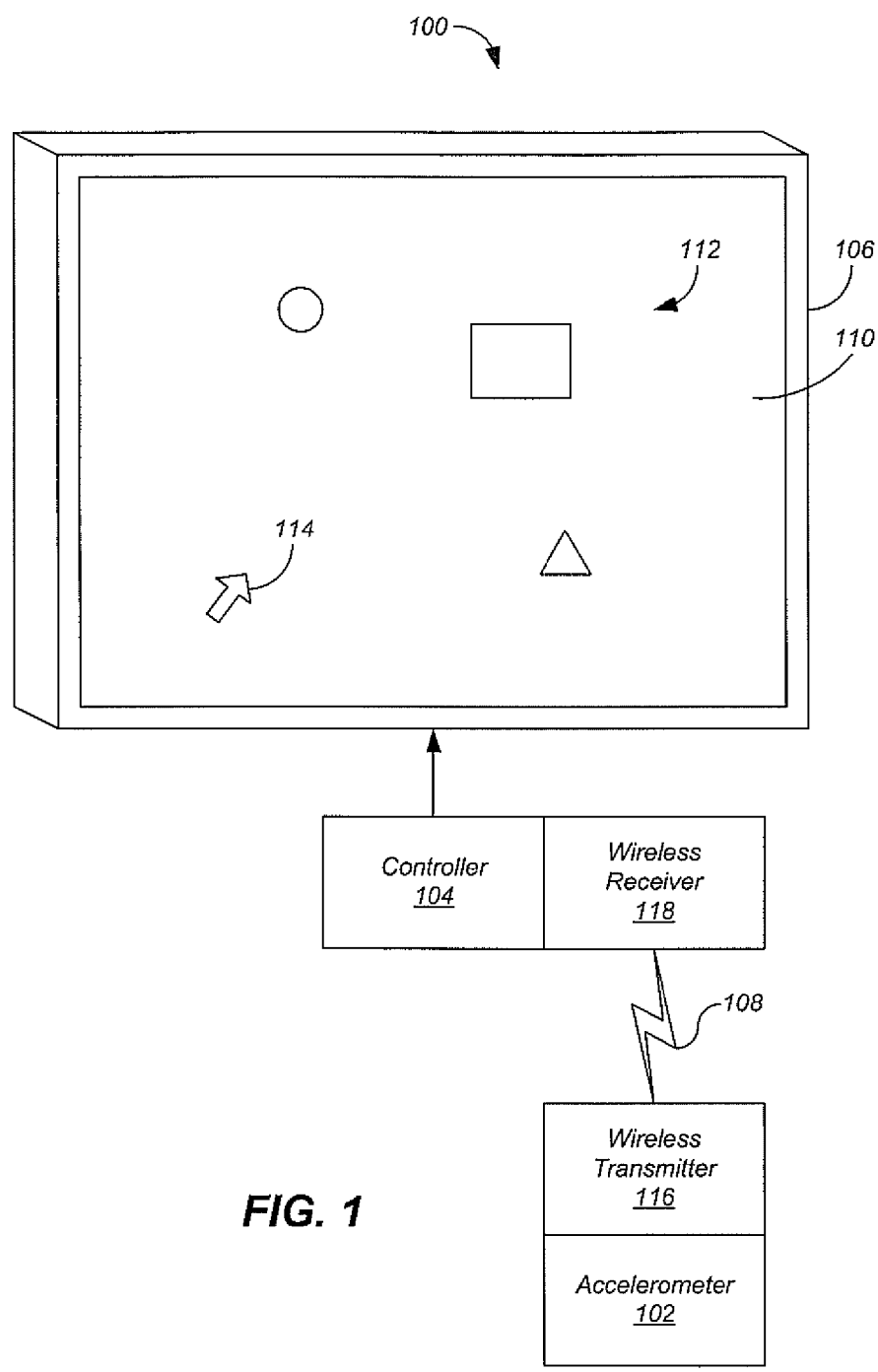
FIG. 1 shows a virtual pointing system comprising an accelerometer worn by a user according to a preferred embodiment of the present invention.

The leading digit(s) of each reference numeral used in this specification indicates the number of the drawing in which the reference numeral first appears.

DETAILED DESCRIPTION

Embodiments of the present invention provide virtual pointing devices for displays such as computer displays and the like. According to some embodiments, an accelerometer adapted to be worn by a user generates an acceleration signal representing acceleration of the user along a plurality of axes, a display device generates a display comprising one or more objects and a cursor, and a controller moves the cursor in the display in accordance with the acceleration signal.

According to other embodiments, a remote motion sensor remotely senses motion of a user along a plurality of axes, and generates a motion signal representing the motion of the user, a display device generates a display comprising one or more objects and a cursor, and a controller moves the cursor in the display in accordance with the motion signal.

In various embodiments, the controller moves the cursor in the display in accordance with acceleration or motion of the user along a first set of the axes, and selects objects according to a position of the cursor and acceleration or motion of the user along a second set of the axes. For example, acceleration or motion in the plane of the display can be used to move the cursor, while acceleration or motion normal to the plane of the display can be used to select objects.

In some embodiments, the display device is a heads-up display. A heads-up display is a form of display where the background is transparent, and the foreground objects are generally somewhat transparent, so the user can see through the display, as is well-known in the relevant arts. For example, when embodiments of the present invention are implemented in a vehicle, the display can be projected upon the windshield of the vehicle. In some embodiments, the driver can use the display to read email, check appointments on a calendar, and to look up contacts, for example for dialing a mobile phone. In some embodiments, the driver can use the display to use a navigation system, to control the vehicle, for example to tune a radio in the vehicle, adjust the vehicle climate controls, or even to control movements of the vehicle.

In embodiments where the user wears an accelerometer in a vehicle, it is necessary to remove accelerations of the vehicle from the accelerations detected by the accelerometer worn by the user. In such embodiments, the vehicle comprises an accelerometer to detect accelerations of the vehicle, and the controller moves the cursor in the display in accordance with the accelerations of the user and the accelerations of the vehicle.

In some embodiments, the acceleration and motion signals are wireless signals. In some embodiments, the wireless signal is compliant with one or more standards including IEEE standards 802.11, 802.11a, 802.11b, 802.11g, 802.11n, 802.16, and 802.20.

FIG. 1 shows a virtual pointing system 100 comprising an accelerometer 102 worn by a user according to a preferred embodiment of the present invention. Virtual pointing system 100 comprises accelerometer 102, a controller 104, and a display device 106. Accelerometer 102, when worn by a user, generates an acceleration signal 108 representing acceleration of the user along a plurality of axes. For example, accelerometer 102 can be implemented as a low-g tri-axis accelerometer such as a Microelectromechanical Systems (MEMS) accelerometer and the like. However, other sorts of accelerometers using the same or other numbers of axes can be used.

Acceleration signal 108 can be transported from accelerometer 102 to controller 104 by any transmission means including wireless, wired, optical, and the like. For example, virtual pointing system 100 can include a wireless transmitter 116 to transmit acceleration signal 108 and a wireless receiver 118 to receive acceleration signal 108. The wireless transmission medium can be a direct link or a network such as a wireless local-area network (WLAN) or the like. The WLAN can be compliant with one or more standards including IEEE standards 802.11, 802.11a, 802.11b, 802.11g, 802.11n, 802.16, and 802.20.

Display device 106 generates a display 110 comprising one or more objects 112 and a cursor 114. Display device 106 can be implemented as any sort of display device. In some embodiments, display device 106 is implemented as heads-up display. These embodiments are especially useful when the user is expected to be engaged in other tasks such as driving a car while using virtual pointing system 100.

Controller 104 moves cursor 114 in display 110 in accordance with acceleration signal 108. Controller 104 can be implemented in digital electronic circuitry, computer hardware and software, or in combinations thereof. In some embodiments, controller 104 moves cursor 114 in display 110 in accordance with acceleration of the user along a first set of the axes, and selects objects 112 according to the position of cursor 114 and acceleration of the user along a second set of the axes.

Figure 2:
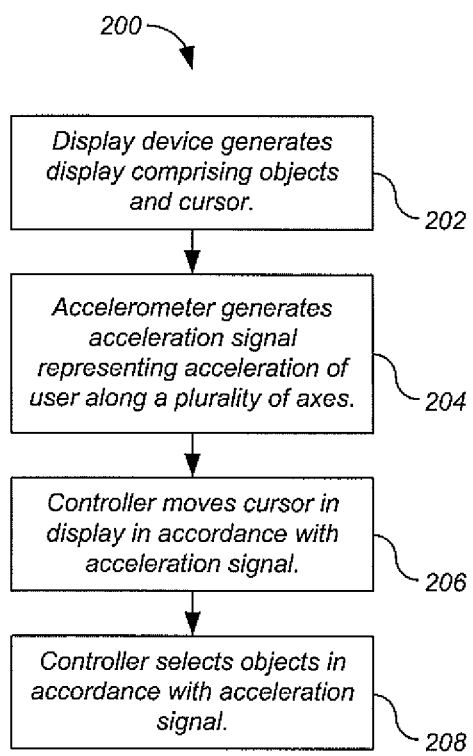
FIG. 2 shows a process for the virtual pointing system of FIG. 1 according to a preferred embodiment of the present invention.

FIG. 2 shows a process 200 for virtual pointing system 100 of FIG. 1 according to a preferred embodiment of the present invention. Although in the described embodiments, the elements of process 200 are presented in one arrangement, other embodiments can feature other arrangements, as will be apparent to one skilled in the relevant arts based on the disclosure provided herein.

Display device 106 generates display 110 comprising objects 112 and cursor 114 (step 202). A user wears accelerometer 102. Accelerometer 102 can be worn on the head, for example as part of a pair of sunglasses, within a wireless headset, and the like, so that the user's hands are free for other tasks. However, accelerometer 102 can be worn elsewhere, for example on a hand, foot, or the like. Accelerometer 102 generates acceleration signal 108 representing acceleration of the user along a plurality of axes (step 204). In some embodiments, acceleration signal 108 is transmitted wirelessly by wireless transmitter 116. Acceleration signal 108 can be a digital signal representing one or more commands.

Controller 104 receives acceleration signal 108. In some embodiments, acceleration signal 108 is received wirelessly by wireless receiver 118. Controller 104 moves cursor 114 in display 110 in accordance with acceleration signal 108 (step 206). In embodiments where acceleration signal 108 represents one or more commands, controller 104 executes the commands, and sends a new image to display device 106.

In some embodiments, controller 104 also selects objects 112 in accordance with acceleration signal 108 (step 208). For example, controller 104 moves cursor 114 in display 110 in accordance with acceleration of the user along a first set of axes, and selects objects 112 according to the position of cursor 114 and acceleration of the user along a second set of the axes. For example, user acceleration in the plane of display 110 can be used to move cursor 114, while user acceleration normal to the plane of display 110 can be used to select objects 112. In other embodiments, accelerometer 102 can be implemented as a dual-axis accelerometer to control motion of cursor 114 in display 110, while objects 112 are selected by a voice command, push button, or the like.

Figure 3:
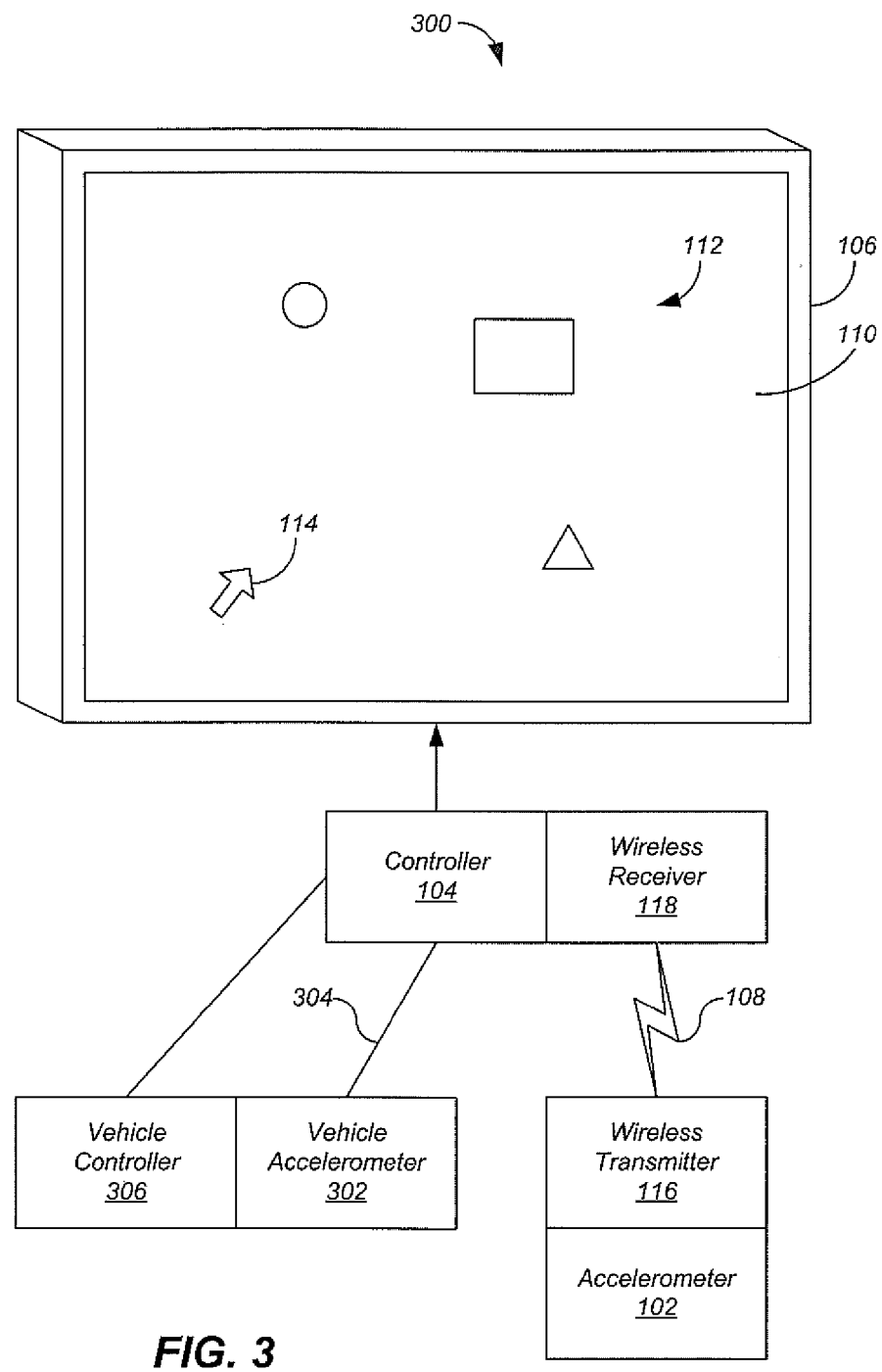
FIG. 3 shows a vehicle comprising the virtual pointing system of FIG. 1 according to a preferred embodiment of the present invention.

In some embodiments, virtual pointing system 100 is implemented within a vehicle such as an automobile. FIG. 3 shows a vehicle 300 comprising virtual pointing system 100 of FIG. 1 according to a preferred embodiment of the present invention. In vehicle 300, the elements of virtual pointing system 100 function as described above. in addition, display device 106 is implemented as a heads-up display that can be projected upon the windshield of vehicle 300.

When implemented in a vehicle 300, virtual pointing system 100 experiences accelerations that will be detected by user accelerometer 102 due to the motion of vehicle 300. To measure these vehicle accelerations, vehicle 300 comprises a vehicle accelerometer 302 to generate a vehicle acceleration signal 304 representing acceleration of vehicle 300 along a plurality of axes. For example, vehicle accelerometer 302 can be implemented as a low-g tri-axis accelerometer such as a MEMS accelerometer and the like. However, other sorts of accelerometers using the same or other numbers of axes can be used.

In some embodiments, accelerations of the user are used to control vehicle 300. In such embodiments, vehicle 300 comprises a vehicle controller 306 to control vehicle 300 in accordance with the user accelerations.

Figure 4:
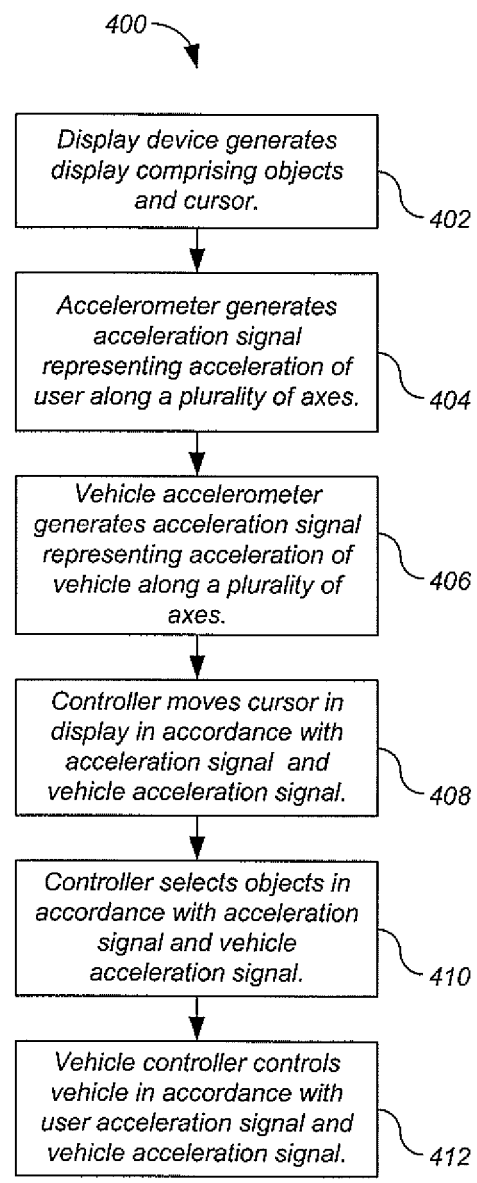
FIG. 4 shows a process for the vehicle of FIG. 2 according to a preferred embodiment of the present invention.

FIG. 4 shows a process 400 for vehicle 300 of FIG. 3 according to a preferred embodiment of the present invention. Although in the described embodiments, the elements of process 400 are presented in one arrangement, other embodiments can feature other arrangements, as will be apparent to one skilled in the relevant arts based on the disclosure provided herein.

Display device 106 generates display 110 comprising objects 112 and cursor 114 (step 402). A user wears accelerometer 102. Accelerometer 102 generates acceleration signal 108 representing acceleration of the user along a plurality of axes (step 404). In some embodiments, acceleration signal 108 is transmitted wirelessly by wireless transmitter 116. Controller 104 receives acceleration signal 108. In some embodiments, acceleration signal 108 is received wirelessly by wireless receiver 118.

Vehicle accelerometer 302 generates vehicle acceleration signal 304 representing acceleration of vehicle 300 along a plurality of axes (step 406). Controller 104 uses vehicle acceleration signal 304 to isolate the accelerations of the user within the frame of reference of vehicle 300. That is, controller 104 moves cursor 114 in display 110 in accordance with user acceleration signal 108 and vehicle acceleration signal 304 (step 408).

In some embodiments, controller 104 also selects objects 112 in accordance with user acceleration signal 108 and vehicle acceleration signal 304 (step 410). For example, controller 104 moves cursor 114 in display 110 in accordance with acceleration of the user along a first set of axes, and selects objects 112 according to the position of cursor 114 and acceleration of the user along a second set of the axes. For example, user acceleration in the plane of display 110 can be used to move cursor 114, while user acceleration normal to the plane of display 110 can be used to select objects 112.

In some embodiments, vehicle controller 306 controls vehicle 300 in accordance with user acceleration signal 108 and vehicle acceleration signal 304 (step 412).

Figure 5:
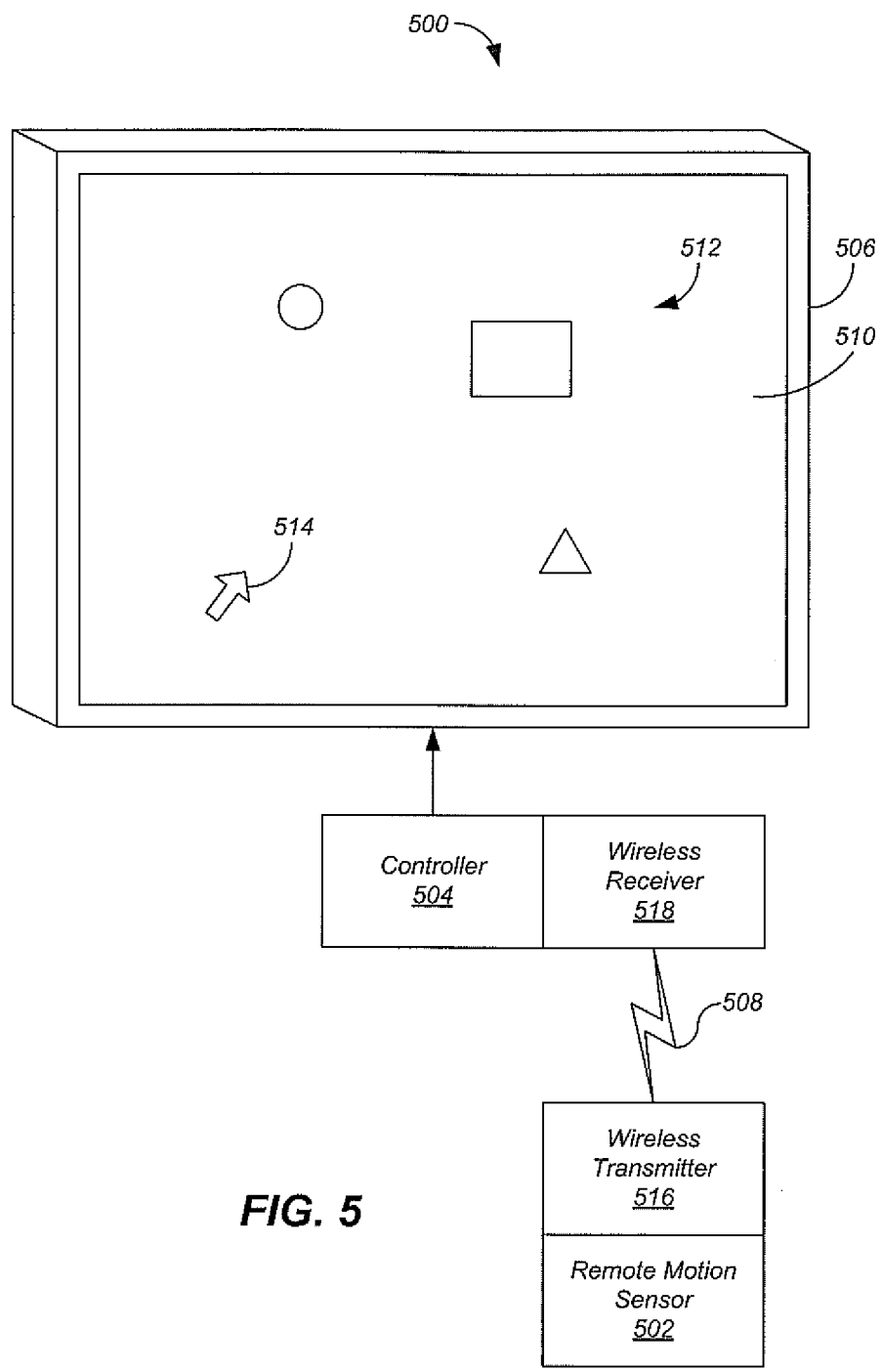
FIG. 5 shows a virtual pointing system comprising a remote motion sensor to remotely sense the motion of a user according to a preferred embodiment of the present invention.

FIG. 5 shows a virtual pointing system 500 comprising a remote motion sensor 502 to remotely sense the motion of a user according to a preferred embodiment of the present invention. Virtual pointing system 500 comprises remote motion sensor 502, a controller 504, and a display device 506.

Remote motion sensor 502 generates a motion signal 508 representing motion of the user along a plurality of axes. Remote motion sensor 502 can be implemented as one or more remote motion sensors, each to detect motion along one or more axes, as is well-known in the relevant arts.

Motion signal 508 can be transported from remote motion sensor 502 to controller 504 by any transmission means including wireless, wired, optical, and the like. For example, virtual pointing system 500 can include a wireless transmitter 516 to transmit motion signal 508 and a wireless receiver 518 to receive motion signal 508. The wireless transmission medium can be a direct link or a network such as a wireless local-area network (WLAN) or the like. The WLAN can be compliant with one or more standards including IEEE standards 802.11, 802.11 a, 802.11 b, 802.11 g, 802.11n, 802.16, and 802.20.

Display device 506 generates a display 510 comprising one or more objects 512 and a cursor 514. Display device 506 can be implemented as any sort of display device. In some embodiments, display device 506 is implemented as heads-up display. These embodiments are especially useful when the user is expected to be engaged in other tasks such as driving a car while using virtual pointing system 500.

Controller 504 moves cursor 514 in display 510 in accordance with motion signal 508. Controller 504 can be implemented in digital electronic circuitry, computer hardware and software, or in combinations thereof. In some embodiments, controller 504 moves cursor 514 in display 510 in accordance with motion of the user along a first set of the axes, and selects objects 512 according to the position of cursor 514 and motion of the user along a second set of the axes.

Figure 6:
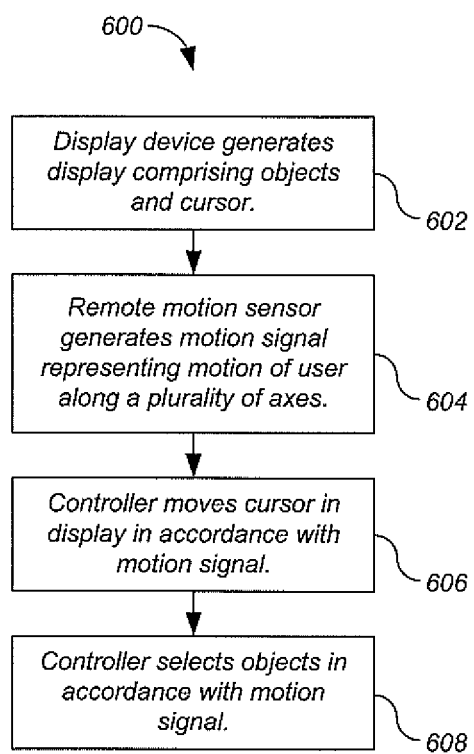
FIG. 6 shows a process for the virtual pointing system of FIG. 5 according to a preferred embodiment of the present invention.

FIG. 6 shows a process 600 for virtual pointing system 500 of FIG. 5 according to a preferred embodiment of the present invention. Although in the described embodiments, the elements of process 600 are presented in one arrangement, other embodiments can feature other arrangements, as will be apparent to one skilled in the relevant arts based on the disclosure provided herein. Display device 506 generates display 510 comprising objects 512 and cursor 514 (step 602).

Remote motion sensor 502 generates motion signal 508 representing motion of a user along a plurality of axes (step 604). Motion signal 508 can be a digital signal representing one or more commands. In some embodiments, motion signal 508 is transmitted wirelessly by wireless transmitter 516.

Controller 504 receives motion signal 508. In some embodiments, motion signal 508 is received wirelessly by wireless receiver 518. Controller 504 moves cursor 514 in display 510 in accordance with motion signal 508 (step 606). In embodiments where motion signal 508 represents one or more commands, controller 504 executes the commands, and sends a new image to display device 506.

In some embodiments, controller 504 also selects objects 512 in accordance with motion signal 508 (step 608). For example, controller 504 moves cursor 514 in display 510 in accordance with motion of the user along a first set of axes, and selects objects 512 according to the position of cursor 514 and motion of the user along a second set of the axes. For example, user motion in the plane of display 510 can be used to move cursor 514, while user motion normal to the plane of display 510 can be used to select objects 512. In other embodiments, motion sensor 502 can be implemented as a dual-axis motion sensor to control motion of cursor 114 in display 510, while objects 512 are selected by a voice command, push button, or the like.

Figure 7:
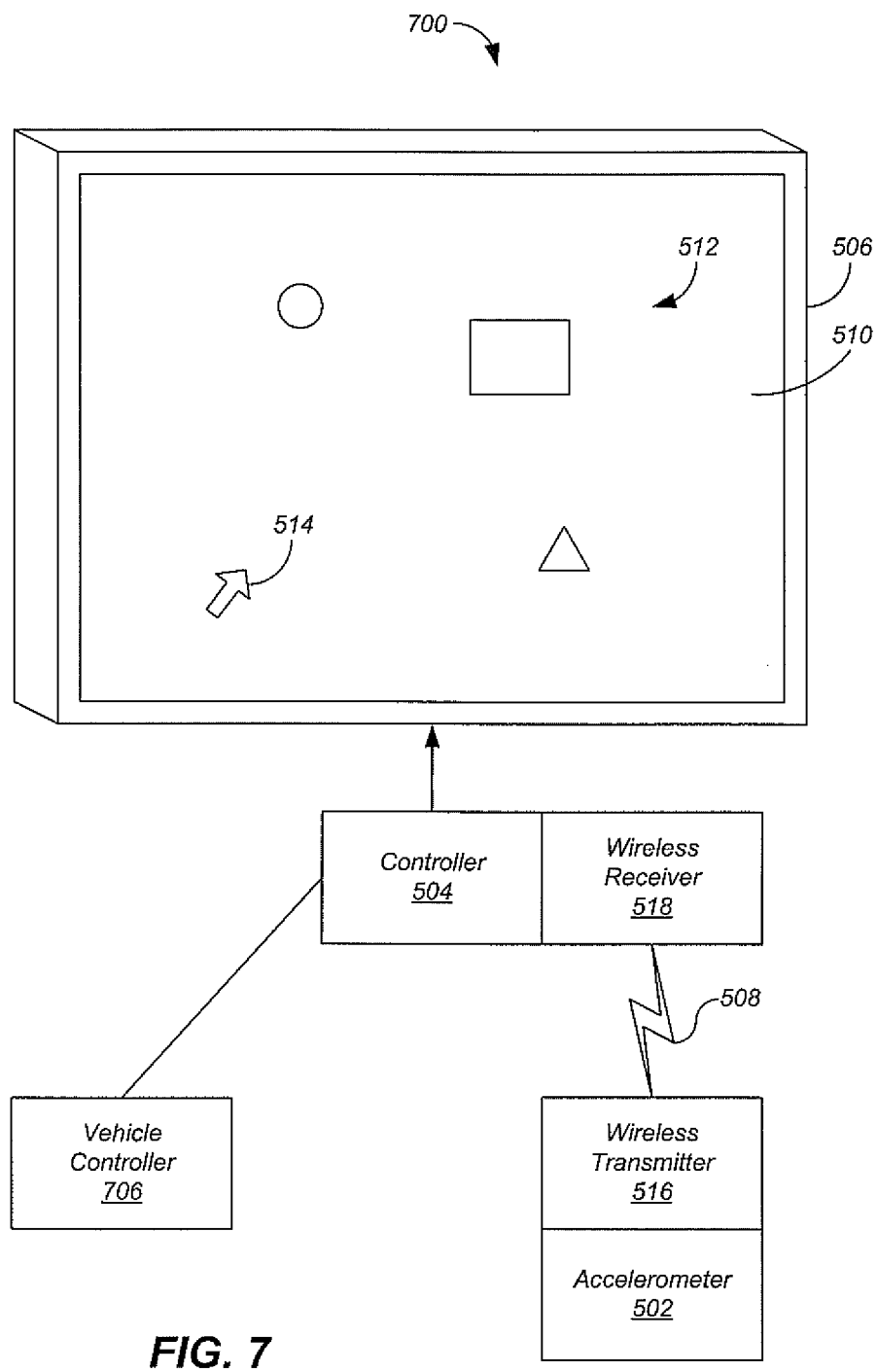
FIG. 7 shows a vehicle comprising the virtual pointing system of FIG. 5 according to a preferred embodiment of the present invention.

In some embodiments, virtual pointing system 500 is implemented within a vehicle such as an automobile. FIG. 7 shows a vehicle 700 comprising virtual pointing system 500 of FIG. 5 according to a preferred embodiment of the present invention. In vehicle 700, the elements of virtual pointing system 500 function as described above. In addition, display device 506 is implemented as a heads-up display that can be projected upon the windshield of vehicle 700.

In some embodiments, motions of the user are used to control vehicle 700. In such embodiments, vehicle 700 comprises a vehicle controller 706 to control vehicle 700 in accordance with the motions of the user.

Figure 8:
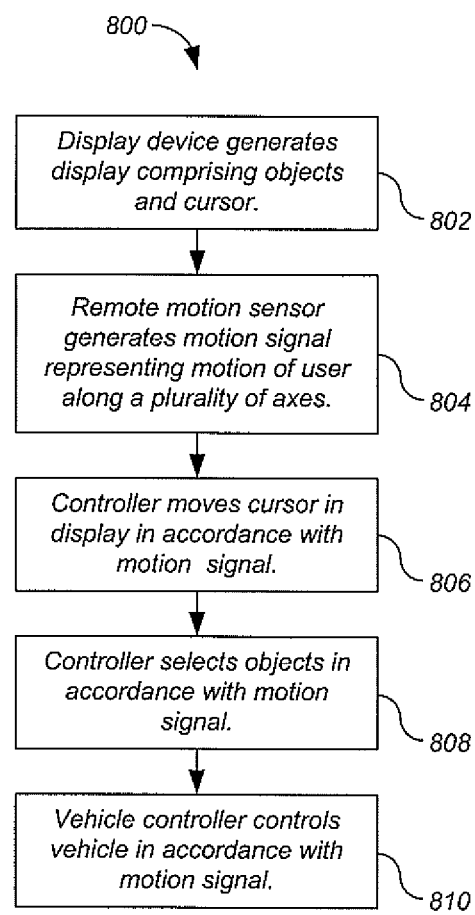
FIG. 8 shows a process for the vehicle of FIG. 7 according to a preferred embodiment of the present invention.

FIG. 8 shows a process 800 for vehicle 700 of FIG. 7 according to a preferred embodiment of the present invention. Although in the described embodiments, the elements of process 800 are presented in one arrangement, other embodiments can feature other arrangements, as will be apparent to one skilled in the relevant arts based on the disclosure provided herein.

Display device 506 generates display 510 comprising objects 512 and cursor 514 (step 802). Remote motion sensor 502 generates a motion signal 508 representing motion of the user along a plurality of axes (step 804). For example, remote motion sensor 502 can be implemented on the dashboard of vehicle 700 or the like. Remote motion sensor 502 can be implemented as one or more remote motion sensors, each to detect motion along one or more axes, as is well-known in the relevant arts. In some embodiments, motion signal 508 is transmitted wirelessly by wireless transmitter 516.

Controller 504 receives motion signal 508. In some embodiments, motion signal 508 is received wirelessly by wireless receiver 518. Controller 504 moves cursor 514 in display 510 in accordance with motion signal 508 (step 806).

In some embodiments, controller 504 also selects objects 512 in accordance with motion signal 508 (step 808). For example, controller 504 moves cursor 514 in display 510 in accordance with motion of the user along a first set of axes, and selects objects 512 according to the position of cursor 514 and motion of the user along a second set of the axes. For example, user motion in the plane of display 510 can be used to move cursor 514, while user motion normal to the plane of display 510 can be used to select objects 512.

In some embodiments, vehicle controller 706 controls vehicle 700 in accordance with motion signal 508 (step 810).

Figure 9B:
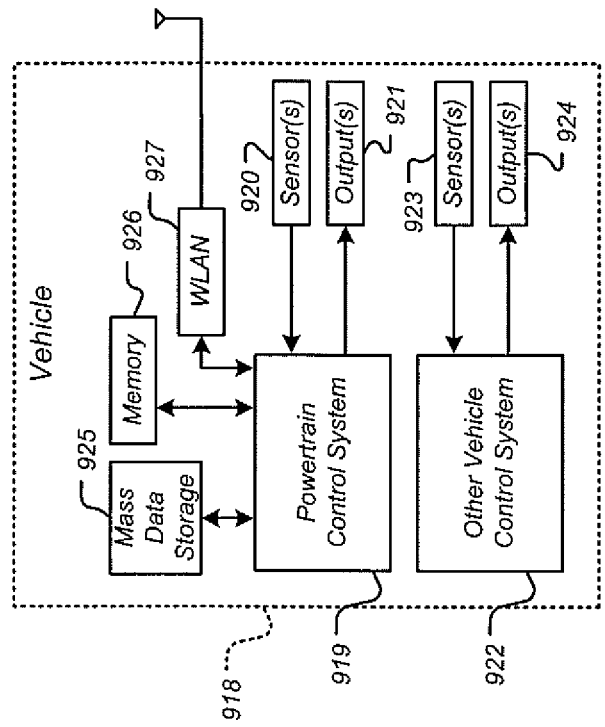
FIGS. 9A-9E show various exemplary implementations of the present invention.
Figure 9A:
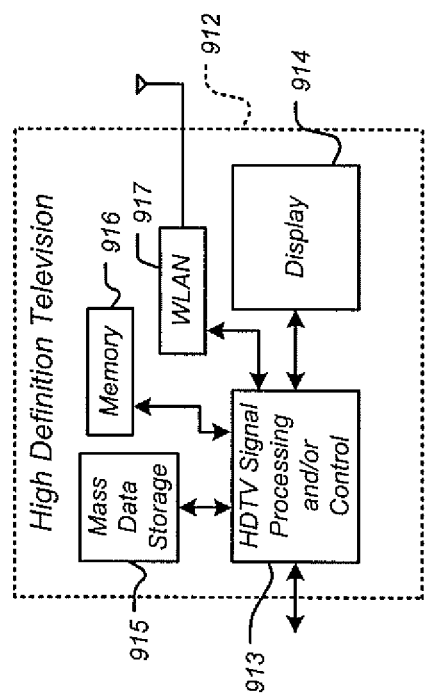

FIGS. 9A-9E show various exemplary implementations of the present invention. Referring now to FIG. 9A, the present invention can be implemented in a high definition television (HDTV) 912. The present invention may implement either or both signal processing and/or control circuits, which are generally identified in FIG. 9A at 913, a WLAN interface and/or mass data storage of the HDTV 912. The HDTV 912 receives HDTV input signals in either a wired or wireless format and generates HDTV output signals for a display 914. In some implementations, signal processing circuit and/or control circuit 913 and/or other circuits (not shown) of the HDTV 912 may process data, perform coding and/or encryption, perform calculations, format data and/or perform any other type of HDTV processing that may be required.

The HDTV 912 may communicate with mass data storage 915 that stores data in a nonvolatile manner such as optical and/or magnetic storage devices. The HDD may be a mini HDD that includes one or more platters having a diameter that is smaller than approximately 1.8". The HDTV 912 may be connected to memory 916 such as RAM, ROM, low latency nonvolatile memory such as flash memory and/or other suitable electronic data storage. The HDTV 912 also may support connections with a WLAN via a WLAN network interface 917.

Referring now to FIG. 9B, the present invention implements a control system of a vehicle 918, a WLAN interface and/or mass data storage of the vehicle control system. In some implementations, the present invention implements a powertrain control system 919 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 922 of the vehicle 918. The control system 922 may likewise receive signals from input sensors 923 and/or output control signals to one or more output devices 924. In some implementations, the control system 922 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 919 may communicate with mass data storage 925 that stores data in a nonvolatile manner. The mass data storage 925 may include optical and/or magnetic storage devices for example hard disk drives HDD and/or DVDs. The HDD may be a mini HDD that includes one or more platters having a diameter that is smaller than approximately 1.8". The powertrain control system 919 may be connected to memory 926 such as RAM, ROM, low latency nonvolatile memory such as flash memory and/or other suitable electronic data storage. The powertrain control system 919 also may support connections with a WLAN via a WLAN network interface 927. The control system 922 may also include mass data storage, memory and/or a WLAN interface (all not shown).

Figure 9C:
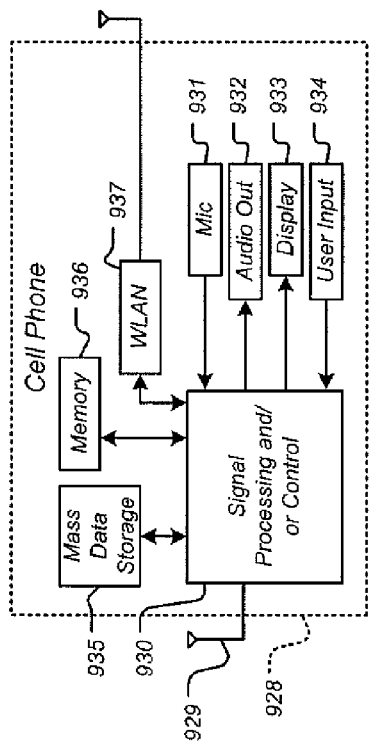

Referring now to FIG. 9C, the present invention can be implemented in a cellular phone 928 that may include a cellular antenna 929. The present invention may implement either or both signal processing and/or control circuits, which are generally identified in FIG. 9C at 930, a WLAN interface and/or mass data storage of the cellular phone 928. In some implementations, the cellular phone 928 includes a microphone 931, an audio output 932 such as a speaker and/or audio output jack, a display 933 and/or an input device 934 such as a keypad, pointing device, voice actuation and/or other input device. The signal processing and/or control circuits 930 and/or other circuits (not shown) in the cellular phone 928 may process data, perform coding and/or encryption, perform calculations, format data and/or perform other cellular phone functions.

The cellular phone 928 may communicate with mass data storage 935 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 928 may be connected to memory 936 such as RAM, ROM, low latency nonvolatile memory such as flash memory and/or other suitable electronic data storage. The cellular phone 928 also may support connections with a WLAN via a WLAN network interface 937.

Figure 9D:
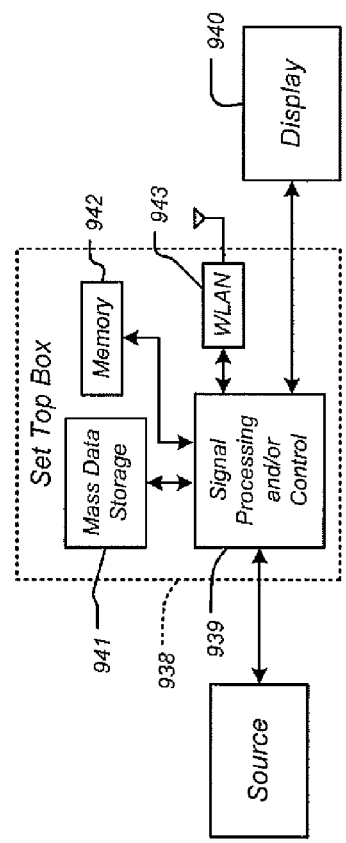

Referring now to FIG. 9D, the present invention can be implemented in a set top box 938. The present invention may implement either or both signal processing and/or control circuits, which are generally identified in FIG. 9D at 939, a WLAN interface and/or mass data storage of the set top box 938. The set top box 938 receives signals from a source such as a broadband source and outputs standard and/or high definition audio/video signals suitable for a display 940 such as a television and/or monitor and/or other video and/or audio output devices. The signal processing and/or control circuits 939 and/or other circuits (not shown) of the set top box 938 may process data, perform coding and/or encryption, perform calculations, format data and/or perform any other set top box function.

The set top box 938 may communicate with mass data storage 943 that stores data in a nonvolatile manner. The mass data storage 943 may include optical and/or magnetic storage devices for example hard disk drives HDD and/or DVDs. The HDD may be a mini HDD that includes one or more platters having a diameter that is smaller than approximately 1.8". The set top box 938 may be connected to memory 942 such as RAM, ROM, low latency nonvolatile memory such as flash memory and/or other suitable electronic data storage. The set top box 938 also may support connections with a WLAN via a WLAN network interface 943.

Figure 9E:
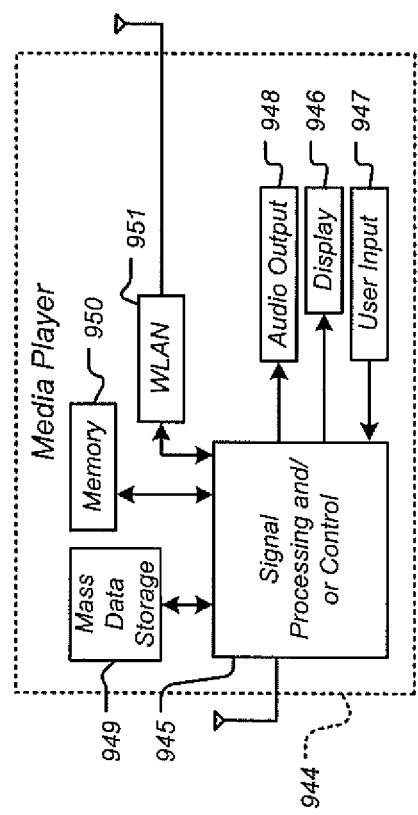

Referring now to FIG. 9E, the present invention can be implemented in a media player 944. The present invention may implement either or both signal processing and/or control circuits, which are generally identified in FIG. 9E at 945, a WLAN interface and/or mass data storage of the media player 944. In some implementations, the media player 944 includes a display 946 and/or a user input 947 such as a keypad, touchpad and the like. In some implementations, the media player 944 may employ a graphical user interface (GUI) that typically employs menus, drop down menus, icons and/or a point-and-click interface via the display 946 and/or user input 947. The media player 944 further includes an audio output 948 such as a speaker and/or audio output jack. The signal processing and/or control circuits 945 and/or other circuits (not shown) of the media player 944 may process data, perform coding and/or encryption, perform calculations, format data and/or perform any other media player function.

The media player 944 may communicate with mass data storage 949 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 944 may be connected to memory 950 such as RAM, ROM, low latency nonvolatile memory such as flash memory and/or other suitable electronic data storage. The media player 944 also may support connections with a WLAN via a WLAN network interface 951. Still other implementations in addition to those described above are contemplated.

Embodiments of the invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
a display device configured to be implemented in a vehicle, wherein the display device is further configured to display, to a user, a cursor relative to one or more objects;
a first accelerometer configured to be implemented in the vehicle in which the display device is implemented, wherein the first accelerometer is further configured to, in response to motion of the vehicle, generate a first signal representing an acceleration of the vehicle due to the motion of the vehicle;
a second accelerometer configured to be worn by the user while the user is in the vehicle in which the display is implemented, wherein the second accelerometer is further configured to, in response to the motion of the vehicle, generate a second signal representing both i) an acceleration of the user within the vehicle, and ii) the acceleration of the vehicle due to the motion of the vehicle; and
a controller configured to
based on the acceleration of the vehicle represented by the first signal, isolate i) the acceleration of the user within the vehicle represented in the second signal from ii) the acceleration of the vehicle represented in the second signal, and
move the cursor relative to the one or more objects, as displayed by the display device, based on the acceleration of the user within the vehicle represented in the second signal as isolated from the acceleration of the vehicle represented in the second signal.

2. The apparatus of claim 1, wherein the controller is further configured to select a first object of the one or more objects displayed in the display in response to i) a position of the cursor in the display, and ii) one or more of the first signal and the second signal.

3. The apparatus of claim 1, wherein the acceleration of the user within the vehicle represented in the second signal, as isolated from the acceleration of the vehicle represented in the second signal, corresponds to acceleration of the user within a plane parallel to the display.

4. The apparatus of claim 3, wherein the controller is configured to select a first object of the one or more objects in the display in response to the acceleration of the user within the vehicle represented in the second signal, as isolated from the acceleration of the vehicle represented in the second signal, corresponding to acceleration of the user in a direction normal to the plane parallel to the display.

5. The apparatus of claim 3, wherein the controller is configured to select a first object of the one or more objects in the display in response to i) a voice command of the user or ii) a button being depressed by the user.

6. The apparatus of claim 1, wherein the display device comprises a heads-up display.

7. The apparatus of claim 6, wherein the heads-up display is configured to display the cursor relative to the one or more objects onto a windshield of the vehicle.

8. The apparatus of claim 1, wherein the controller is configured to control the vehicle in response to the acceleration of the user within the vehicle represented in the second signal as isolated from the acceleration of the vehicle represented in the second signal.

9. The apparatus of claim 1, wherein the vehicle comprises an automobile.

10. The apparatus of claim 1, further comprising a wireless communication system configured to wirelessly transmit the second signal from the second accelerometer to the controller.

11. The apparatus according to claim 10, wherein the wireless communication system is compliant with at least one of IEEE standards 802.11, 802.11a, 802.11b, 802.11g, 802.11n, 802.16, and 802.20.

12. A method comprising:
displaying, on a display device to a user, a cursor relative to one or more objects, wherein the display device is implemented in a vehicle;
in response to motion of the vehicle,
generating a first signal representing an acceleration of the vehicle due to the motion of the vehicle, and
generating a second signal representing both i) an acceleration of the user within the vehicle, and ii) the acceleration of the vehicle due to the motion of the vehicle;
based on the acceleration of the vehicle represented by the first signal, isolating i) the acceleration of the user within the vehicle represented in the second signal from ii) the acceleration of the vehicle represented in the second signal; and
moving the cursor relative to the one or more objects, as displayed by the display device, based on the acceleration of the user within the vehicle represented in the second signal as isolated from the acceleration of the vehicle represented in the second signal.

13. The method of claim 12, further comprising selecting a first object of the one or more objects displayed in the display in response to i) a position of the cursor in the display, and ii) one or more of the first signal and the second signal.

14. The method of claim 13, wherein the acceleration of the user within the vehicle represented in the second signal, as isolated from the acceleration of the vehicle represented in the second signal, corresponds to acceleration of the user within a plane parallel to the display.

15. The method of claim 14, further comprising selecting a first object of the one or more objects in the display in response to the acceleration of the user within the vehicle represented in the second signal, as isolated from the acceleration of the vehicle represented in the second signal, corresponding to acceleration of the user in a direction normal to the plane parallel to the display.

16. The method of claim 14, further comprising selecting a first object of the one or more objects in the display in response to i) a voice command of the user or ii) a button being depressed by the user.

17. The method of claim 12, further comprising displaying the cursor relative to the one or more objects onto a windshield of the vehicle.

18. The method of claim 12, further comprising controlling the vehicle in response to the acceleration of the user within the vehicle, represented in the second signal as isolated from the acceleration of the vehicle represented in the second signal.

19. The method of claim 12, further comprising wirelessly transmitting the second signal.

20. The method according to claim 19, wherein the wirelessly transmitting is compliant with at least one of IEEE standards 802.11, 802.11a, 802.11b, 802.11g, 802.11n, 802.16, and 802.20.

* * * * *